US010844954B2

(12) United States Patent
Kamio

(10) Patent No.: US 10,844,954 B2
(45) Date of Patent: Nov. 24, 2020

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/867,809

(22) Filed: May 6, 2020

(65) Prior Publication Data
US 2020/0271221 A1 Aug. 27, 2020

Related U.S. Application Data

(63) Continuation of application No. PCT/JP2018/042382, filed on Nov. 16, 2018.

(30) Foreign Application Priority Data

Nov. 20, 2017 (JP) .................................. 2017-222863

(51) Int. Cl.
*F16H 61/12* (2010.01)
*F16H 61/32* (2006.01)
*F16H 63/50* (2006.01)

(52) U.S. Cl.
CPC .............. *F16H 61/12* (2013.01); *F16H 61/32* (2013.01); *F16H 63/50* (2013.01); *F16H 2061/124* (2013.01); *F16H 2061/326* (2013.01); *F16H 2063/508* (2013.01)

(58) Field of Classification Search
CPC .. F16H 61/12; F16H 61/32; F16H 2061/1224; F16H 2061/1232; F16H 2061/1256; F16H 2061/1288; F16H 2061/124; F16H 2061/326; F16H 2063/508; B60W 10/06; B60W 10/11

See application file for complete search history.

(56) References Cited

U.S. PATENT DOCUMENTS

| | | | |
|---|---|---|---|
| 2005/0156550 A1* | 7/2005 | Kamio | F16H 61/32 318/445 |
| 2008/0001568 A1* | 1/2008 | Hori | F16H 61/32 318/652 |
| 2008/0129236 A1* | 6/2008 | Isobe | G05B 19/19 318/468 |
| 2016/0102761 A1 | 4/2016 | Kuwahara et al. | |

FOREIGN PATENT DOCUMENTS

| | | |
|---|---|---|
| JP | 5-87233 | 4/1993 |
| WO | 2019/088245 | 5/2019 |
| WO | 2019/102933 | 5/2019 |
| WO | 2019/102934 | 5/2019 |

* cited by examiner

*Primary Examiner* — Edwin A Young
(74) *Attorney, Agent, or Firm* — Nixon & Vanderhye, P.C.

(57) ABSTRACT

A shift range control device switches a shift range by controlling a drive of a motor, and includes an abnormality monitoring unit and a torque control command unit. The abnormality monitoring unit detects an abnormality occurrence of an intermediate range stop in which the output shaft to which the drive of the motor is transmitted stops in an intermediate range region. The intermediate range region is a range outside a range guarantee region that guarantees the function of each range. When an abnormality of the intermediate range stop occurs, the torque control command unit commands suppression of the torque applied to the automatic transmission.

9 Claims, 8 Drawing Sheets

SHIFT RANGE CONTROL DEVICE

CROSS REFERENCE TO RELATED APPLICATION

This application is a continuation application of International Patent Application No. PCT/JP2018/042382 filed on Nov. 16, 2018, which designated the U.S. and based on and claims the benefits of priority of Japanese Patent Application No. 2017-222863 filed on Nov. 20, 2017. The entire disclosure of all of the above applications is incorporated herein by reference.

TECHNICAL FIELD

The present disclosure relates to a shift range control device.

BACKGROUND

There has hitherto known a shift device that switches a shift range by controlling a motor in response to a shift range switching request from a driver.

SUMMARY

An object of the present disclosure is to provide a shift range control device that can protect the automatic transmission even when an abnormality that cannot drive the motor occurs.

A shift range control device of the present disclosure switches a shift range by controlling a drive of a motor, and includes an abnormality monitoring unit and a torque control command unit. The abnormality monitoring unit detects an abnormality occurrence of an intermediate range stop in which the output shaft to which the drive of the motor is transmitted stops in an intermediate range region. The intermediate range region is a range outside a range guarantee region that guarantees the function of each range. The torque control command unit issues a command to suppress the torque applied to the automatic transmission when the abnormality of the intermediate range stop occurs.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, a shift range control device will be described with reference to the drawings.

One Embodiment

Figure 1:
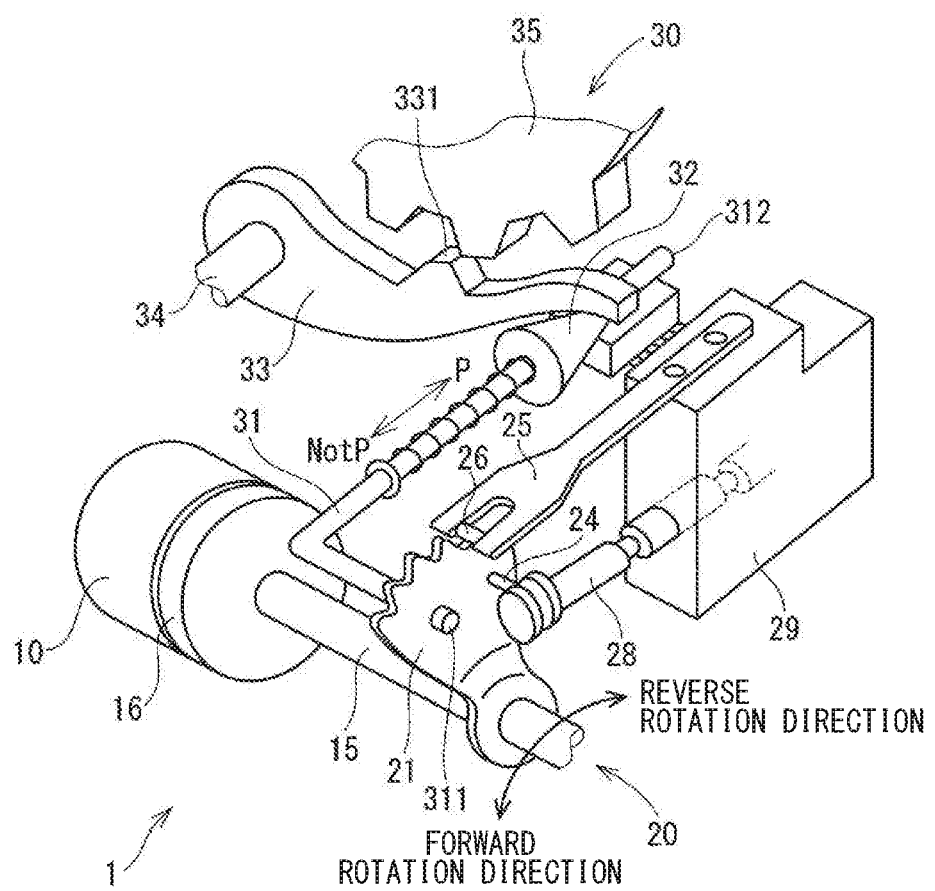
FIG. 1 is a perspective view showing a shift-by-wire system according to one embodiment.
Figure 2:
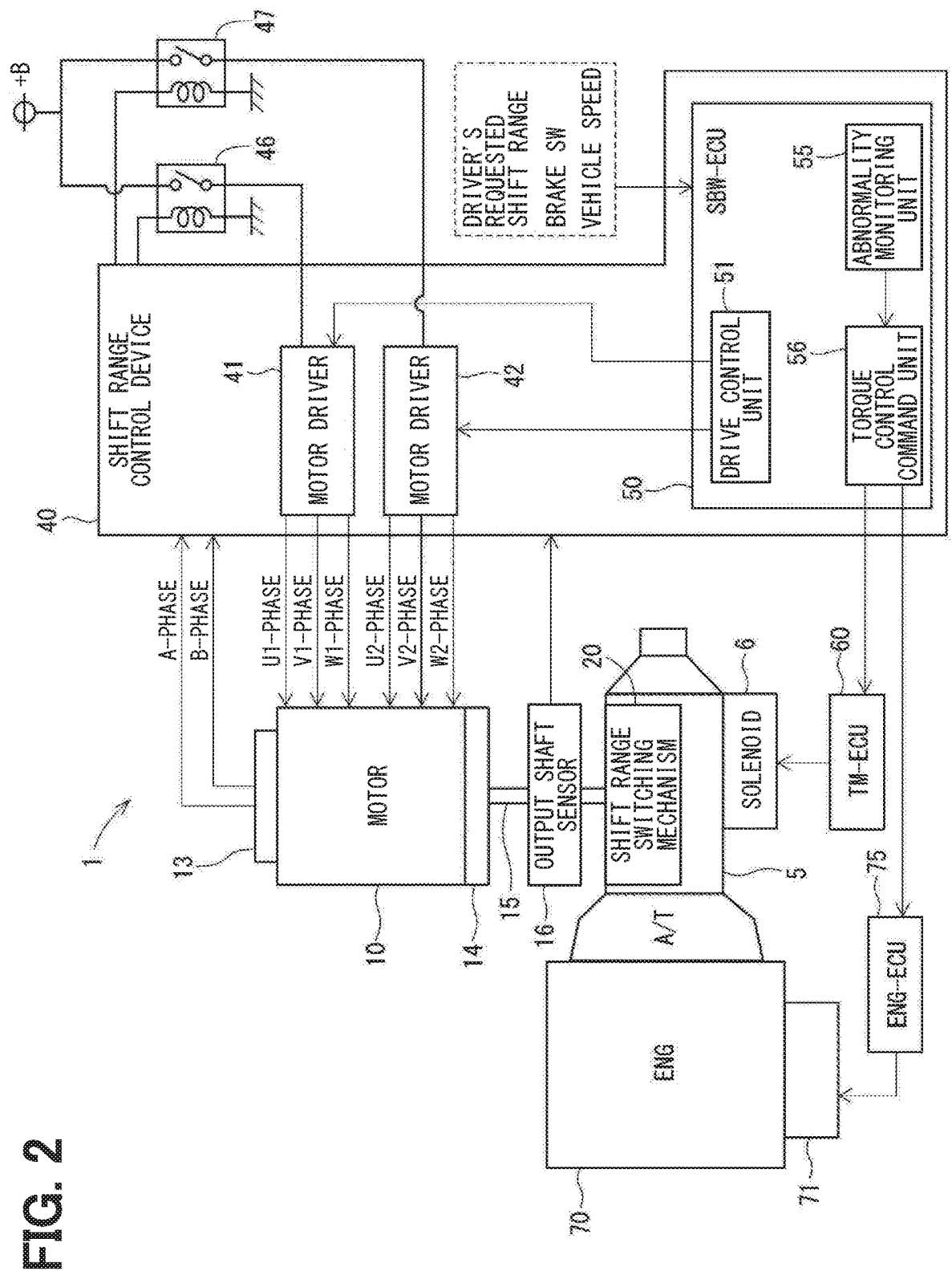
FIG. 2 is a schematic configuration diagram showing the shift-by-wire system according to one embodiment.

A shift range control device according to one embodiment is shown in FIGS. 1 to 9. As shown in FIGS. 1 and 2, a shift-by-wire system 1 as a shift range switching system includes a motor 10, a shift range switching mechanism 20, a parking lock mechanism 30, a shift range control device 40, and the like.

The motor 10 is supplied with electric power from a battery 45 (see FIG. 3), which is carried in a vehicle (not shown), to rotate thereby to function as a drive source of the shift range switching mechanism 20. The motor 10 of the present embodiment is a permanent magnet type DC brushless motor, and generates a cogging torque. In this specification, the cogging torque that occurs in a state where the power is turned off, and the torque due to motor friction and the like are appropriately referred to as "motor cogging torque".

Figure 3:
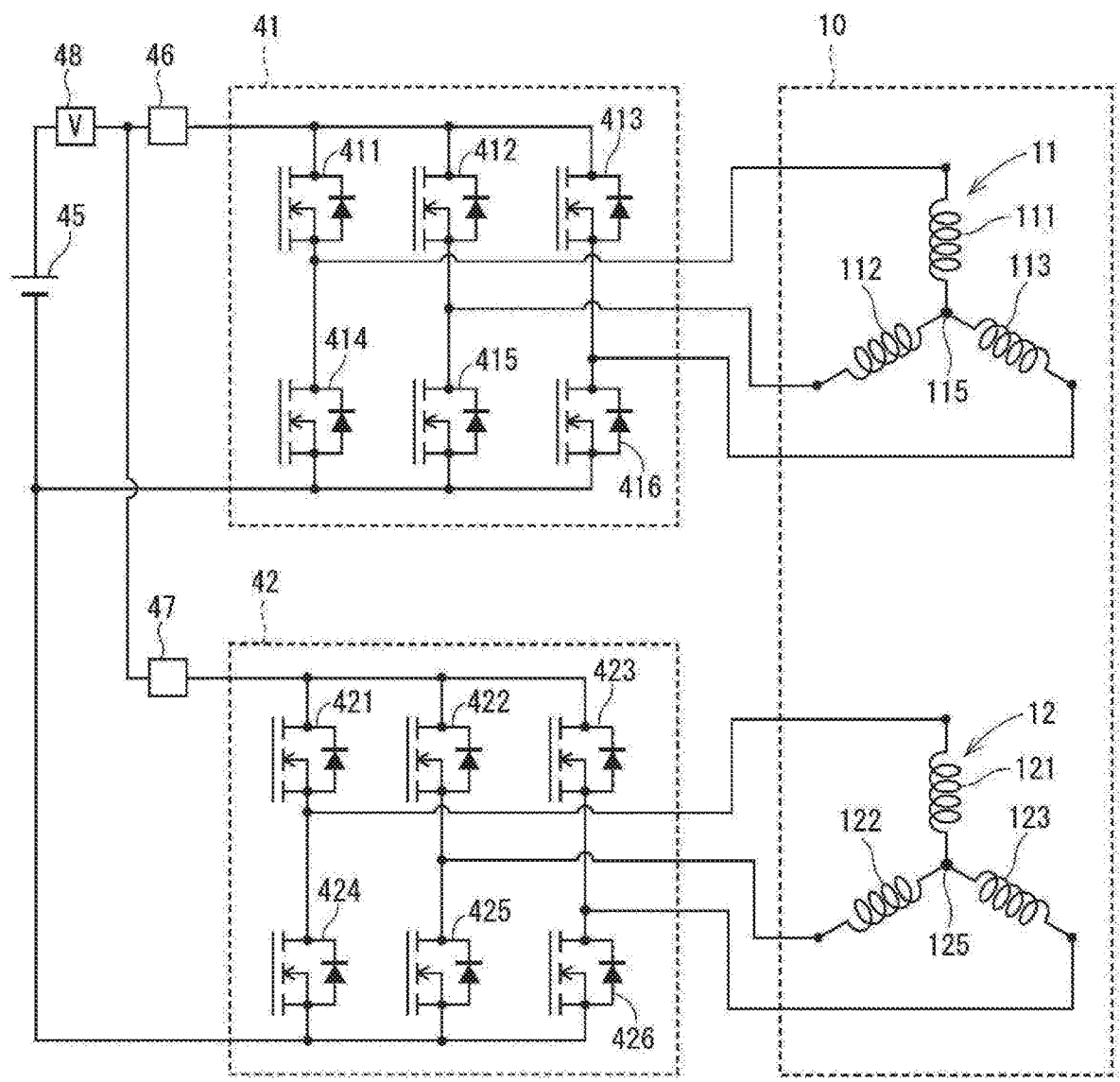
FIG. 3 is a circuit diagram illustrating a motor and a motor driver according to one embodiment.

As shown in FIG. 3, the motor 10 includes two sets of windings 11 and 12. A first winding set 11 includes a U1 coil 111, a V1 coil 112, and a W1 coil 113. A second winding set 12 includes a U2 coil 121, a V2 coil 122, and a W2 coil 123.

As shown in FIG. 2, an encoder 13 detects a motor angle θm that a rotation position of a rotor (not shown) of the motor 10. The encoder 13 is, for example, a magnetic rotary encoder and is made up of a magnet that rotates integrally with the rotor, a magnetic detection hall integrated circuit (IC), and the like. The encoder 13 outputs A-phase and B-phase pulse signals at predetermined angles in synchronization with the rotation of the rotor.

The decelerator 14 is provided between a motor shaft 105 (refer to FIG. 4), which is a rotation shaft of the motor 10, and an output shaft 15. The decelerator 14 reduces the rotation of the motor 10 and outputs the rotation of the motor to the output shaft 15. The rotation of the motor 10 is thus transmitted to the shift range switching mechanism 20. The output shaft 15 is provided with an output shaft sensor 16 that detects an output shaft angle θs that is an angle of the output shaft 15. The output shaft sensor 16 is, for example, a potentiometer. In the present embodiment, a play such as a gear backlash exists between the motor shaft 105 and the output shaft 15. Hereinafter, the total play between the motor shaft 105 and the output shaft 15 will be referred to as "play" as appropriate.

As shown in FIG. 1, the shift range switching mechanism 20 includes a detent plate 21, a detent spring 25 and the like. The shift range switching mechanism 20 transmits the rotational drive force output from the decelerator 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 moves back and forth in the axial direction to switch hydraulic pressure supply paths, which are lead to a hydraulic clutch (not shown), thereby to switch an engagement state of the hydraulic clutch. In this way, the shift range is switched.

Figure 5:
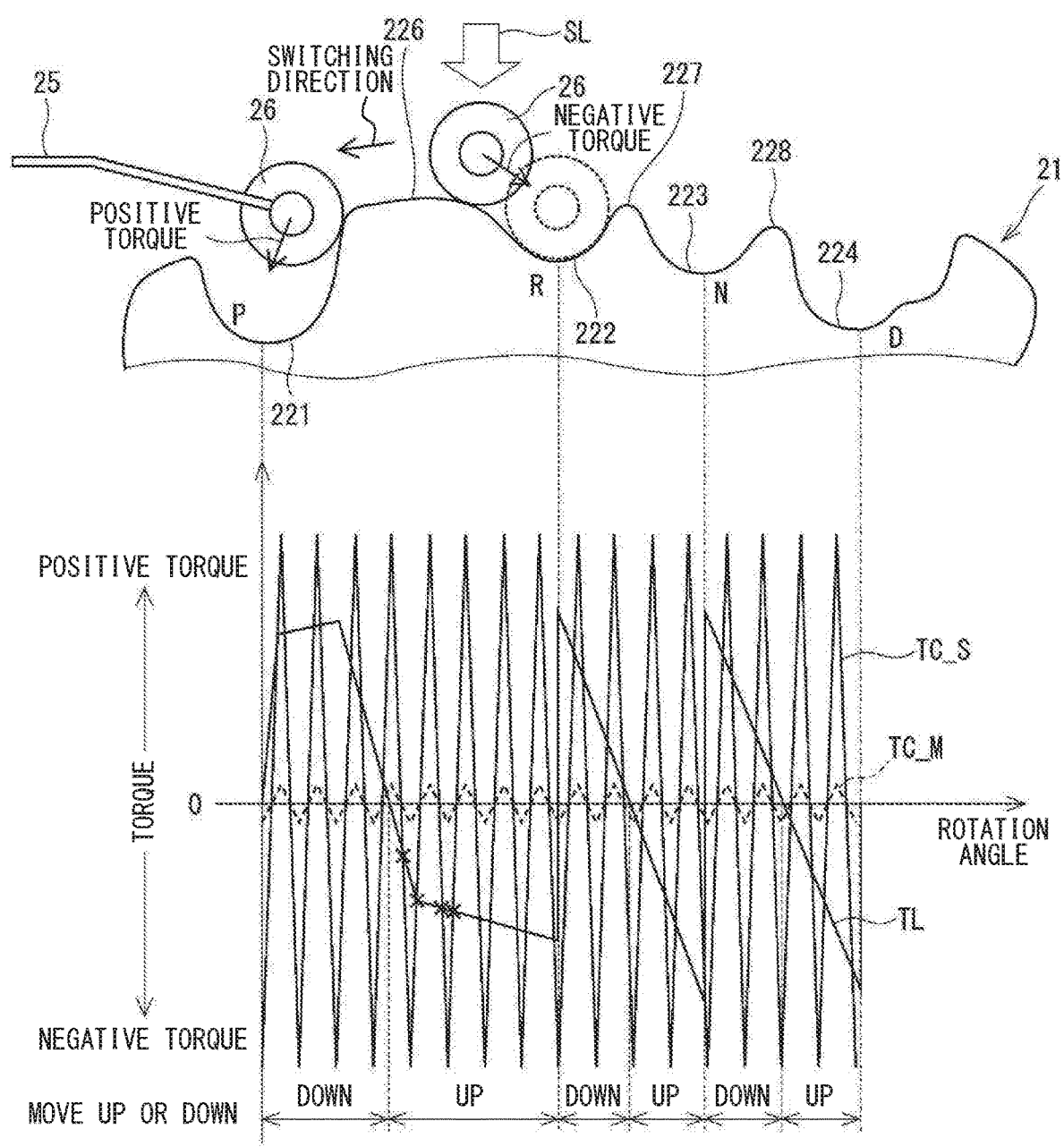
FIG. 5 is an explanatory diagram illustrating torque applied to the detent mechanism according to one embodiment.

As shown in FIGS. 1 and 5, the detent spring 25 side of the detent plate 21 is provided with four valley portions 221 to 224 that hold the manual valve 28 at positions corresponding to the respective ranges. The valley portions 221 to 224 are, from the tip end side of the detent spring 25, arranged in an order of a P valley portion 221 corresponding to a P (parking) range, a R valley portion 222 corresponding to a R (reverse) range, a N valley portion 223 corresponding to a N (neutral) range, and a D valley portion 224 corresponding to a D (drive) range.

The detent spring 25 which is a biasing member is a resiliently deformable plate-like member provided with a detent roller 26 at a tip end. The detent roller 26 is an engaging member. The detent spring 25 biases the detent roller 26 toward a rotation center of the detent plate 21. When a rotational force equal to or larger than a predetermined level is applied to the detent plate 21, the detent spring 25 is deformed resiliently to enable the detent roller 26 to move among the valley portions 221 to 224. For example, when switching from the P range to the D range, the detent plate 21 rotates in the forward rotation direction, so that the detent roller 26 moves from the P valley portion 221 to the D valley portion 224 and fits into the D valley portion 224. The detent roller 26 fits into one of the valley portions 221 to 224 thereby to restrict movement of the detent plate 21. In this way, the axial position of the manual valve 28 and the state of the parking lock mechanism 30 are adjusted, and the shift range of the automatic transmission 5 is fixed.

Figure 6:
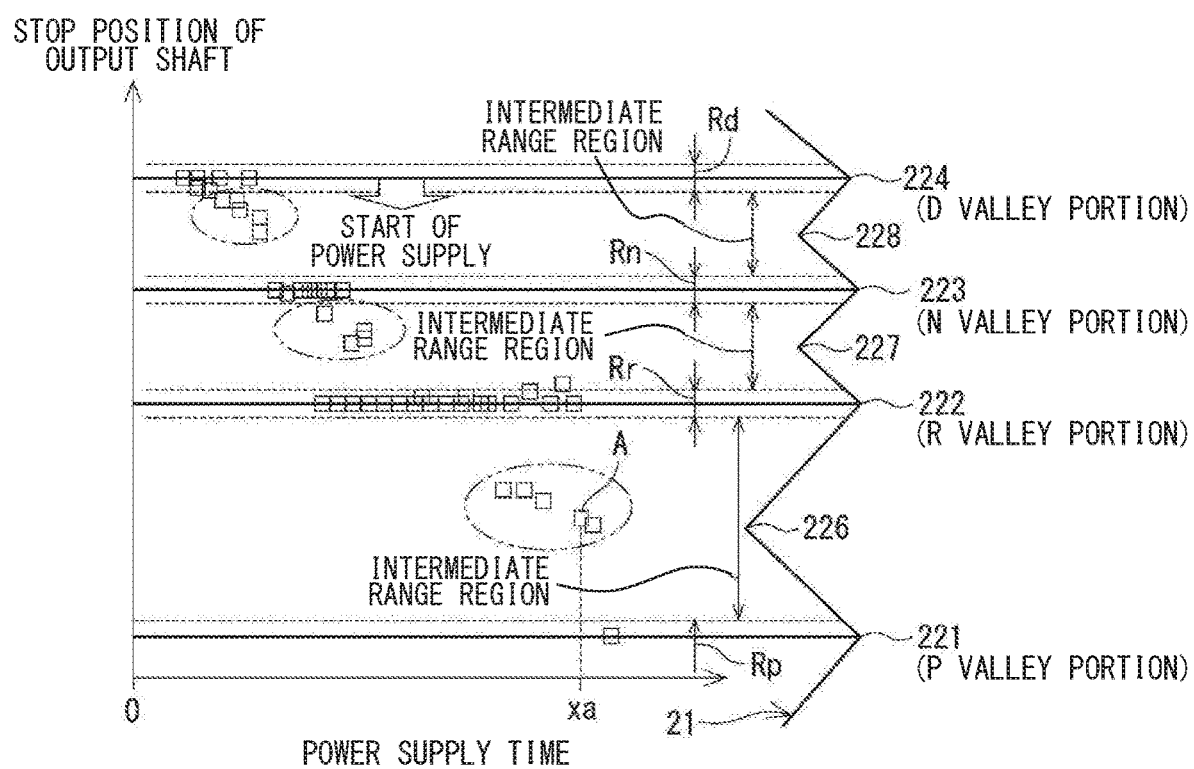
FIG. 6 is an explanatory diagram illustrating a relationship between an energization time and a position of an output shaft stop according to one embodiment.

As shown in FIG. 6, a region Rp is a region which is on an opposite side of the R valley portion 222 with respect to a predetermined position on the R valley portion 222 side from a center of the P valley portion 221. When the output shaft angle of the detent roller 26 is in the region Rp, the detent roller 26 is in a P lock guarantee range in which the parking lock by the parking lock mechanism 30 is guaranteed. A region Rr is a predetermined range including a center of the R valley portion 222. When the output shaft angle of the detent roller 26 is within the region Rr, the detent roller 26 is in a R oil pressure generation range in which the oil pressure of the R range by the automatic transmission 5 is guaranteed. A region Rd is a predetermined range including a center of the D valley portion 224. When the output shaft angle of the detent roller 26 is in the region Rd, the detent roller 26 is in a D oil pressure generation range in which the oil pressure of the D range by the automatic transmission 5 is guaranteed. A region Rn is a predetermined range including a center of the N valley portion 223. When the output shaft angle of the detent roller 26 is in the region Rn, the detent roller 26 is in a range where it is guaranteed that no oil pressure is generated in a state that a friction engagement element (not shown) is not engaged in an oil passage of the automatic transmission 5. Hereinafter, the regions Rp, Rr, Rn, and Rd are appropriately set as the range guaranteed region, and the regions other than the range guaranteed region are set as the intermediate range region.

As shown in FIG. 1, the parking lock mechanism 30 includes a parking rod 31, a conical member 32, a parking lock pawl 33, a shaft portion 34, and a parking gear 35. The parking rod 31 is formed in a substantially L-shape, and one end 311 of the parking rod 31 is fixed to the detent plate 21. The conical member 32 is provided to the other end 312 of the parking rod 31. The conical member 32 is formed to reduce in diameter toward the other end 312. When the detent plate 21 pivots in a reverse rotation direction, the conical member 32 moves toward a direction of an arrow P.

The parking lock pawl 33 is configured to abut on a conical surface of the conical member 32 and to pivot around the shaft portion 34, and the parking lock pawl 33 has a protrusion 331 on the side of the parking gear 35. The protrusion 331 is configured to mesh with the parking gear 35. When the detent plate 21 rotates in the reverse rotation direction and the conical member 32 moves in the direction of arrow P, the parking lock pawl 33 is pushed up, and the protrusion 331 meshes with the parking gear 35. On the other hand, when the detent plate 21 rotates in the forward rotational direction and the conical member 32 moves in a direction of an arrow non-P, the engagement between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle 95 is not restricted by the parking lock mechanism 30. When the shift range is the P range, the parking gear 35 is locked by the parking lock pawl 33 and the rotation of the axle is restricted.

As shown in FIGS. 2 and 3, the shift range control device 40 includes motor drivers 41 and 42, a shift-by-wire ECU 50, and the like. The shift-by-wire ECU is referred to as "SBW-ECU." The motor driver 41 is a three phase inverter configured to switch energization of the first winding set 11 and includes switching elements 411 to 416 which are bridge-connected with each other. The switching elements 411 and 414 are paired and belong to U-phase. The switching elements 411 and 414 have a connection point therebetween, and the connection point is connected with one end of an U1 coil 111. The switching elements 412 and 415 are paired and belong to V-phase. The switching elements 412 and 415 have a connection point therebetween, and the connection point is connected with one end of a V1 coil 112. The switching elements 413 and 416 are paired and belong to W-phase. The switching elements 413 and 416 have a connection point therebetween, and the connection point is connected with one end of a W1 coil 113. The other ends of the coils 111 to 113 are connected to each other at a connected portion 115.

The motor driver 42 is a three phase inverter configured to switch energization of the second winding set 12 and includes switching elements 421 to 426 which are bridge-connected with each other. The switching elements 421 and 424 are paired and belong to U-phase. The switching elements 421 and 424 have a connection point therebetween, and the connection point is connected with one end of the U2 coil 121. The switching elements 422 and 425 are paired and belong to V-phase. The switching elements 422 and 425 have a connection point therebetween, and the connection point is connected with one end of the V2 coil 122. The switching elements 423 and 426 are paired and belong to W-phase. The switching elements 423 and 426 have a connection point therebetween, and the connection point is connected with one end of the W2 coil 123. The other ends of the coils 121 to 123 are connected at a connection portion 125. While the switching elements 411 to 416 and 421 to 426 according to the present embodiment are MOSFETs, other devices such as IGBTs may also be employed.

A motor relay 46 is provided between the motor driver 41 and the battery 45. A motor relay 47 is provided between the motor driver 42 and the battery 45. When a starter switch, such as an ignition switch or the like, is turned on, the motor relays 46 and 47 are energized to supply electric power to the motor 10. When the starter switch is turned off, the motor relays 46 and 47 are deenergized to shut off electric power supply to the motor 10. A voltage sensor 48 for detecting a battery voltage Vb is provided on a high potential side of the battery 45.

The SBW-ECU 50 controls on/off operations of the switching elements 411 to 416 and 421 to 426, and controls a drive of the motor 10 so as to control switching of the shift range. A transmission ECU 60 as a transmission control unit that controls the automatic transmission 5 controls the drive of the transmission hydraulic control solenoid 6 based on an accelerator opening degree, a vehicle speed, an engine speed, an output shaft angle θs, and the like. The transmission hydraulic control solenoid 6 is controlled to manipulate a shift stage. The number of the transmission hydraulic control solenoids 6 is determined according to the shift stage or the like. The transmission ECU is referred to simply as "TM-ECU."

An engine ECU 75 controls an engine 70 as an engine control unit. The engine ECU controls a throttle opening degree of a throttle device 71 or a fuel injection amount of a fuel injection valve (not shown) based on the accelerator opening degree and the like.

Each of ECUs 50, 60, 75 is mainly composed of a microcomputer and the like, and internally includes, although not shown in the figure, a CPU, a ROM, a RAM, an I/O, a bus line for connecting these components, and the like. Each process executed by the ECU 50, 60, and 75 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit. The ECUs 50, 60, and 75 are configured to be able to mutually transmit and receive information via, for example, a CAN (Controller Area Network) or the like.

The SBW-ECU 50 has a drive control unit 51, an abnormality monitoring unit 55, a torque control command unit 56, and the like. The drive control unit 51 controls the drive of the motor 10 by performing a feedback control or the like such that the motor 10 is stopped at a position where the motor angle θm matches the target angle θcmd of the motor set in response to the required shift range, based on the motor angle θm and the angle θs of the output shaft. The detail of the drive control for the motor 10 may be anything.

The abnormality monitoring unit 55 monitors an abnormality of the shift-by-wire system 1. In the present embodiment, an abnormality of an intermediate range stop in which the detent roller 26 stops in the intermediate range region due to the occurrence of a motor-off failure in which the motor 10 stops during range switching is detected. When the abnormality of the intermediate range stop occurs, the torque control command unit 56 instructs the TM-ECU 60 and the engine ECU 75 which are the external devices to suppress the torque applied to the automatic transmission 5.

Figure 4:
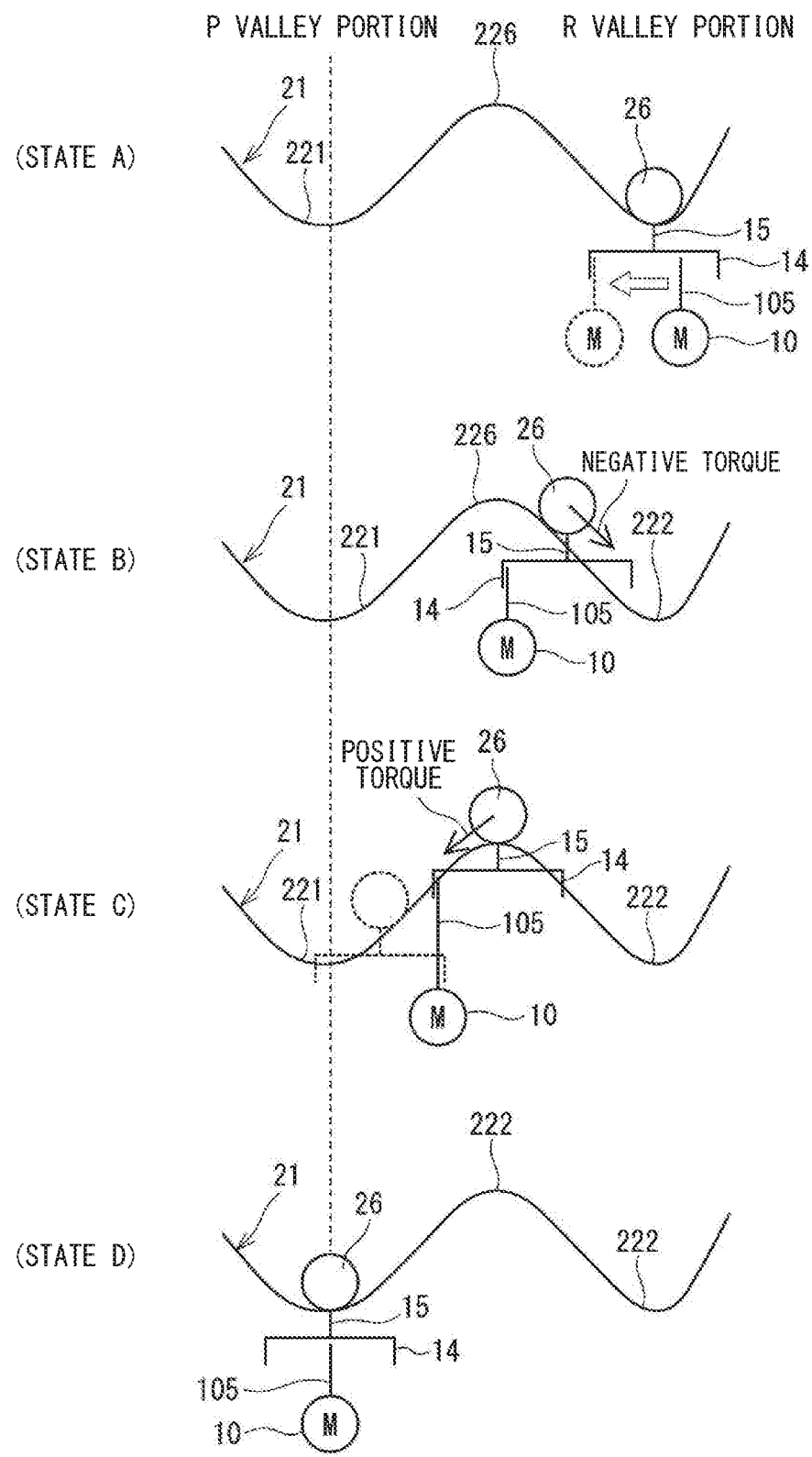
FIG. 4 is an explanatory diagram illustrating a behavior of a detent mechanism according to one embodiment.

Here, a behavior of the detent mechanism at the time of switching of the shift range will be described with reference to FIG. 4. FIG. 4 schematically shows a concept of "play", in which the output shaft 15 and the decelerator 14 are integrated, and the motor shaft 105 is movable within the range of play of the decelerator 14. The motor shaft 105 and the decelerator 14 may be integrated with each other so that "play" may exist between the decelerator 14 and the output shaft 15. In this example, the "play" between the motor shaft 105 and the output shaft 15 will be mainly described as existing between the gear of the decelerator 14 and the motor shaft 105. However, the "play" can be regarded as a sum total of play or backlash which is present between the motor shaft 105 and the output shaft 15.

Hereinafter, an example in which the range other than the P range is switched to the P range will be mainly described. FIG. 4 schematically shows a state in which the detent roller 26 moves from the R valley portion 222 to the P valley portion 221 by the rotation of the motor 10. In FIG. 4, the rotation direction of the motor 10 and the output shaft 15 is described as a left-right direction in the drawing, and the state in which the detent roller 26 moves with the rotation of the motor 10 is shown from the upper stage to the lower stage. Namely, the state is changed from a state A to a state D through states B and C. In practice, the detent roller 26 moves between the valley portions 221 to 224 as the detent plate 21 rotates integrally with the output shaft 15. However, in FIG. 4, the detent roller 26 is illustrated assumedly as moving together with the output shaft 15.

Before describing the behavior of the detent mechanism, the torque applied to the detent mechanism will be described with reference to FIG. 5. As shown in an upper part of FIG. 5, when the detent plate 21 is rotated, a first state in which the load torque TL generated by the spring load SL of the detent spring 25 acts as a positive torque assisting the drive torque of the motor 10, and a second state in which the load torque TL acts as a negative torque that hinders the drive torque of the motor 10 are repeated. When the shift range is switched to a direction of the P range, the torque applied to the detent roller 26 in the P direction is defined as positive torque, and the torque applied to the detent roller 26 in the D direction is defined as negative torque. The positive torque is mainly generated by the drive torque of the motor 10 and the spring load SL while the detent roller 26 is moving down. The negative torque is mainly generated by the spring load SL while the detent roller 26 is moving up.

As shown in FIG. 4, in the shift-by-wire system 1, in the shift range switching mechanism 20, the detent roller 26 moves between the valley portions 221 to 224 by the rotation of the detent plate 21 so as to switch the shift range. In the present embodiment, by using the play provided between the motor shaft 105 and the output shaft 15, the detent roller 26 is set in one of the valley portions 221 to 224 according to the required shift range with the spring load SL.

When the detent roller 26 is moved from the R valley portion 222 to the P valley portion 221, the motor 10 rotates within the play as shown in a state A, so that the motor shaft 105 and the decelerator 14 come into contact with each other, and the play becomes narrow. When the play is not existed, the motor shaft 105 and the output shaft 15 rotate integrally, and the detent roller 26 starts moving up.

As shown in the state B, when the detent roller 26 moves up from the R valley portion 222 to a mountain portion 226, the motor 10 pulls the output shaft 15. At this time, the spring load SL acts as a negative torque.

As shown in the state C, when the detent roller 26 moves down from an apex of the mountain portion 226 to the P valley portion 221, the spring load SL acts as a positive torque. The output shaft 15 precedes the motor 10, and enters the P valley portion 221 within the play. Then, as shown in the state D, the detent roller 26 is set in the P valley portion 221.

In the present embodiment, the motor 10 is a DC motor having a permanent magnet, and the motor cogging torque TC_M is periodically generated as shown in the lower part of FIG. 5. A generation cycle of the cogging torque is proportional to the number of magnetic poles of the motor 10 and the like. The motor cogging torque TC_M is amplified according to the gear ratio of the decelerator 14 and transmitted to the output shaft 15. Hereinafter, the cogging torque amplified by the decelerator 14 is referred to as an output shaft cogging torque TC_S.

As indicated by "x" in FIG. 5, a torque balance point occurs where the load torque TL and the output shaft cogging torque TC_S are balanced on the moving-up side. In particular, when the gear ratio of the decelerator 14 is large and the maximum value of the output shaft cogging torque TC_S is larger than the maximum value of the negative torque by the detent spring 25, the number of torque balance points increases as compared with the case where the maximum value of the output shaft cogging torque TC_S is smaller than the negative torque maximum value. In addition, in order to avoid complication, "x" marks indicating the torque balance points are partially described.

Here, a case where the motor-off failure occurs in which the motor 10 cannot be driven due to disconnection or the like, during the range switching will be described. If the motor-off failure occurs while the detent roller 26 moves down, the spring load SL acts as a positive torque. Therefore, if a large play is provided, the detent roller 26 can be dropped to the valley portion by the spring load SL.

On the other hand, when the motor-off failure occurs during the moving-up of the detent roller, the spring load SL acts as a negative torque. For this reason, when the motor-off failure occurs at the torque balance point, the detent roller 26 stops on the way of the moving-up, and a new problem that causes an abnormality of the intermediate range stop has been found (see FIG. 8). In the case where the detent roller 26 stops at the torque balance point, the abnormality of the intermediate range stop is not solved even if the play is large. In the case of a motor that does not have permanent magnets, such as a switch reluctance motor, for example, no cogging torque is generated so that the torque balance point is not occurred. Therefore, the abnormality of the intermediate range stop doe not occur, since the detent roller 26 enters any of the valley portions 221 to 224 with the spring load SL of the detent spring 25.

In FIG. 6, each square mark indicates a stop position of the output shaft 15. Each stop position of the output shaft 15 when the power supply is turned off after a certain time has elapsed is shown, in a case where the detent roller 26 moves from the D valley portion 224 when the power supply to the motor is started, and reaches the P valley portion 221. Even if the power supply is turned off during range switching, the detent roller 26 is dropped into any of the valley portions 221 to 224 due to the spring load SL depending on the timing of turning off power supply. However, as shown by the two-dot chain line, if the power is turned off while the detent roller 26 is moving up, there is a possibility that the detent roller stops in the intermediate range region.

Figure 7:
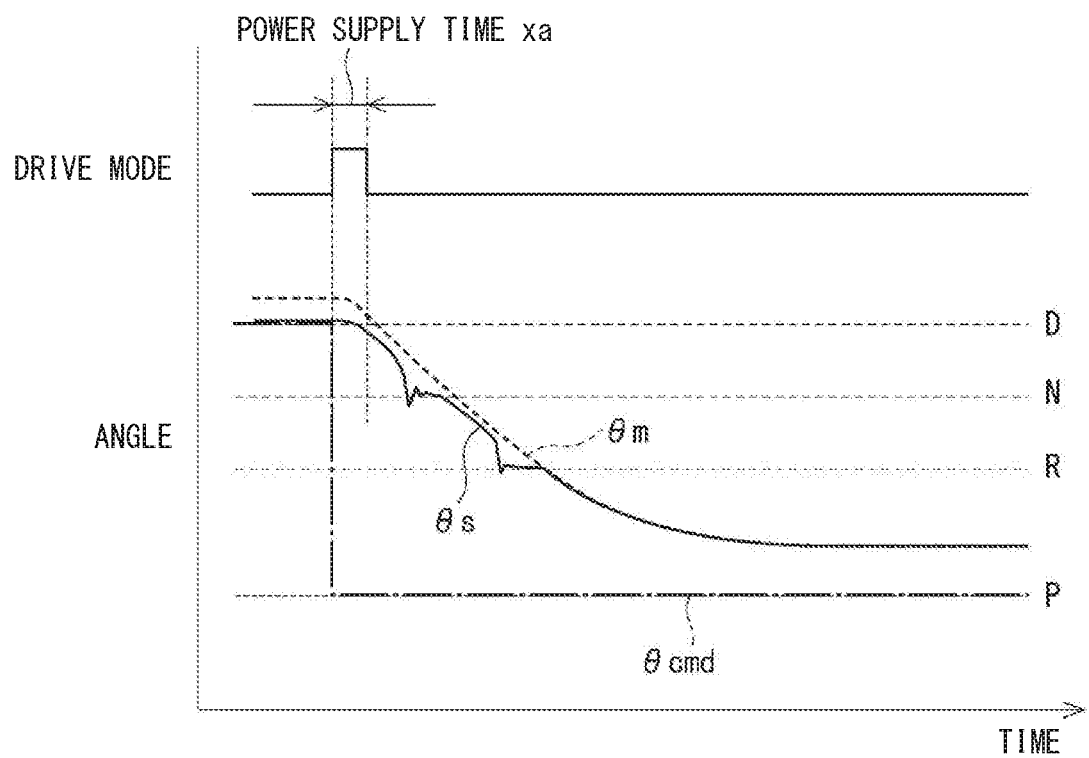
FIG. 7 is a time chart showing an experimental result when energization is turned off after energization for a predetermined time in one embodiment.
Figure 8:
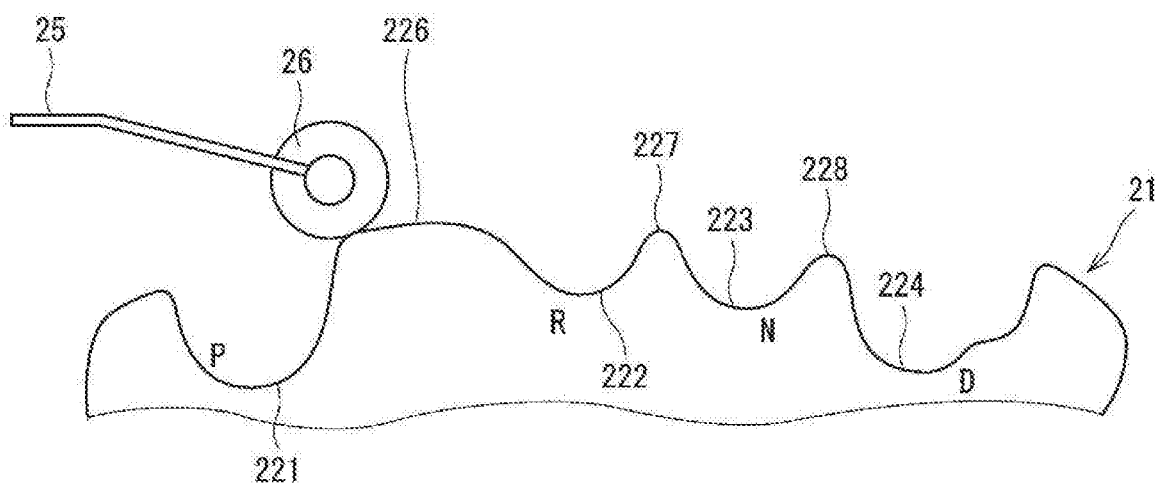
FIG. 8 is a schematic diagram showing a state in which an abnormality of the intermediate range stop is occurred in one embodiment.

FIGS. 7 and 8 show experimental results when the power supply time to the motor 10 is xa, and corresponds to a point A in FIG. 6. In FIG. 7, the horizontal axis is an axis as a common time, and the drive modes and angles are shown from the top part. P, R, N, and D in FIG. 7 correspond to the output shaft angles when the detent roller 26 is at the center of the valley portions 221 to 224. Further, the motor angle $\theta m$ and the motor angle target value $\theta cmd$ are converted into the angle of the output shaft, and are described.

When the detent roller 26 is in the D valley portion 224 and the power supply is turned off after the power supply is performed for the time xa, the motor angle $\theta m$ does not reach the motor angle target value $\theta cmd$, and the output shaft angle $\theta s$ stops in the intermediate range region between the R valley portion 222 and the P valley portion 221.

If an abnormality occurs in which the output shaft 15 stops in the intermediate range region, the manual valve 28 stops at an incomplete position, so that an appropriate hydraulic pressure cannot be generated. Therefore, there is a possibility that the automatic transmission 5 will fail. Further, since an output shaft of the engine 70 and an input shaft of the automatic transmission 5 are connected, if torque is applied from the engine 70 side to the automatic transmission 5 side in the state of the abnormality of the intermediate range stop, the automatic transmission 5 may fail.

Therefore, in the present embodiment, when the output shaft stops in the intermediate range due to the motor-off failure during switching of the shift range, a protection process for the automatic transmission is performed to prevent the engine torque from being applied to the automatic transmission 5.

Figure 9:
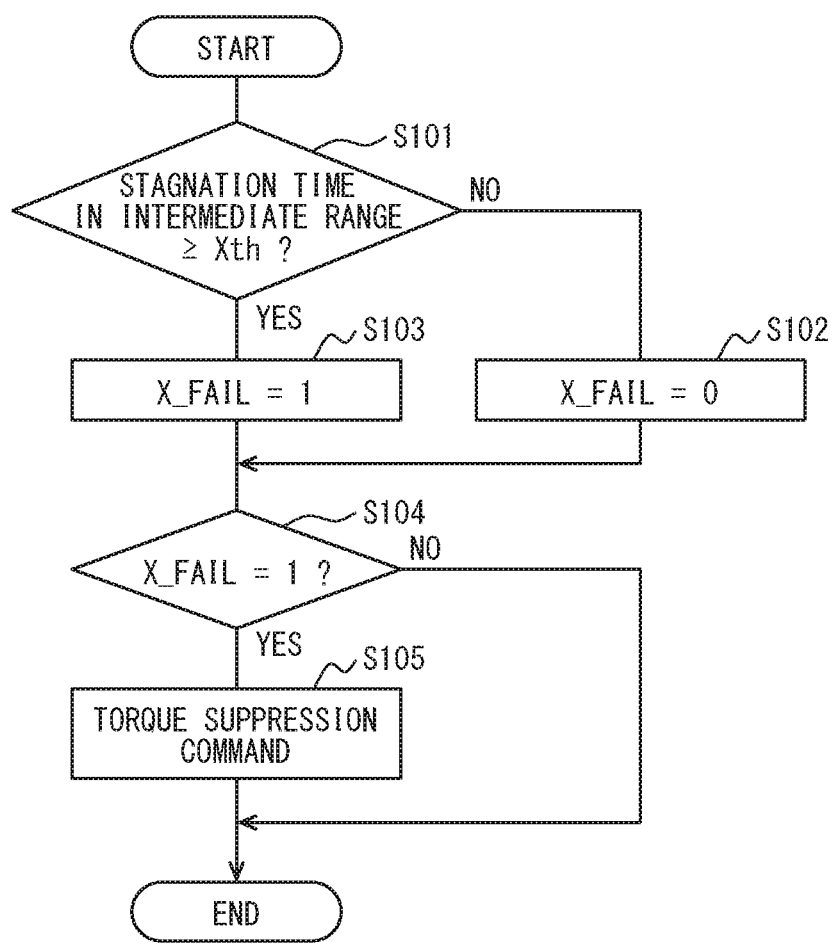
FIG. 9 is a flowchart illustrating a process of an automatic transmission protection according to one embodiment.

The automatic transmission protection process will be described with reference to the flowchart of FIG. 9. The present process is executed by the SBW-ECU 50 at a predetermined cycle interval. Hereinafter, "step" in step S101 is omitted, and is simply referred to as a symbol "S." The same applies to the other steps.

In S101, the abnormality monitoring unit 55 determines whether a stagnation time in the intermediate range, which is the time when the detent roller 26 is stopped in the intermediate range region, is equal to or longer than the stagnation determination time Xth. The stagnation determination time Xth is set to a predetermined time longer than the time required for switching range. The stagnation determination may be made based on the motor angle $\theta m$ or may be made based on the output shaft angle $\theta s$. When it is determined that the intermediate range stagnation time is shorter than the stagnation determination time Xth (S101: NO), the process proceeds to S102, and the stagnation determination flag X_FAIL is reset. When it is determined that the intermediate range stagnation time is equal to or longer than the stagnation determination time Xth (S101: YES), the process proceeds to S103, and the stagnation determination flag X_FAIL is set. In the figure, a state where the flag is set is 1 and a state where the flag is reset is 0.

In S104, the torque control command unit 56 determines whether the stagnation determination flag X_FAIL is set. When it is determined that the stagnation determination flag X_FAIL has not been set (S104: NO), this routine ends. When it is determined that the stagnation determination flag X_FAIL is set (S104: YES), the process proceeds to S105.

In S105, the torque control command unit 56 outputs a torque suppression command for preventing the engine torque from being applied to the automatic transmission 5 in order to protect the automatic transmission 5. Specifically, the torque control command unit 56 issues a neutral command to the TM-ECU 60 as a torque control command. The TM-ECU 60 acquires the neutral command from the SBW-ECU 50, and controls the solenoid 6 so as to bring the oil pressure of the automatic transmission 5 into the neutral state. The torque control command unit 56 instructs the engine ECU 75 to suppress the engine torque. The engine ECU 75 obtains the engine torque suppression command from the SBW-ECU 50, the engine ECU 75 controls the throttle device 71 so as to maintain the throttle opening in the idle state regardless of the opening angle of the accelerator pedal. One of the neutral instruction to the transmission ECU 60 and the torque suppression instruction to the engine ECU 75 may be omitted.

Thus, in a system using a motor that generates cogging torque as a drive source of the shift-by-wire system 1, even if an abnormality occurs such that the motor 10 cannot be driven in the intermediate range region, it is possible to prevent the automatic transmission 5 from being damaged. Further, since there is no need to change the system and so on, it is possible to prevent the automatic transmission 5 from being damaged without increasing the cost.

As described above, the shift range control device 40 of the present embodiment switches the shift range by controlling the drive of the motor 10 and includes the abnormality monitoring unit 55 and the torque control command unit 56. The abnormality monitoring unit 55 detects an abnormality occurrence of an intermediate range stop in which the output shaft 15 to which the drive of the motor 10 is transmitted stops in an intermediate range region. The intermediate range region is a range outside a range guarantee region that guarantees the function of each range. When the abnormality of the intermediate range stop occurs, the torque control command unit 56 instructs the TM-ECU 60 and the engine ECU 75 to suppress the torque applied to the automatic transmission 5. Thereby, the failure of the automatic transmission 5 due to the occurrence of the abnormality of the intermediate range stop can be prevented without changing the system configuration. Further, since no significant system change is required, the same mountability as that of the related art can be maintained.

The torque control command unit 56 issues a neutral command to the TM-ECU 60. The torque control command unit 56 instructs the engine ECU 75 to suppress the engine torque. Thereby, when the abnormality of the intermediate range stop occurs, the torque applied to the automatic transmission 5 can be appropriately suppressed.

OTHER EMBODIMENTS

In the embodiments described above, the motor is the DC brushless motor. In other embodiments, the motor may be any motor. In the above embodiment, the motor driver as the drive circuit is a three-phase inverter. In another embodiment, the drive circuit may have any circuit configuration capable of switching the energization of the motor winding. In the above embodiment, the SBW-ECU, the TM-ECU, and the engine ECU are provided separately. In another embodiment, for example, when the SBW-ECU and the TM-ECU are configured by one ECU, the torque suppression command may be issued internally when the abnormality of the intermediate range stop occurs. The same applies to the engine ECU.

In the above embodiment, the motor rotation angle sensor is the encoder. In another embodiment, the motor rotation angle sensor is not limited to the encoder, but any other device such as a resolver may be used. In the present embodiment, the potentiometer was illustrated as an output shaft sensor. In other embodiments, the output shaft sensor may be anything. For example, the output shaft sensor may be a switch that is turned on in each range guarantee area, or a non-contact magnetic sensor. Further, the output shaft sensor may be omitted.

According to the embodiments described above, the four valley portions are formed in the detent plate. As another embodiment, the number of the valley portions is not limited to four but may be any number. For example, two valley portions corresponding to the P range and the not P range other than the P range may be provided. The shift range switching mechanism and the parking lock mechanism or the like may be different from those in the embodiments described above.

In the above embodiments, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the decelerator between the motor shaft and the output shaft may be omitted, or a mechanism other than the decelerator reducer may be provided. The present disclosure is not limited to the above embodiment, and various modifications may be implemented without departing from the spirit of the present disclosure.

The present disclosure has been described based on the embodiments. However, the present disclosure is not limited to the embodiments and the structures. The present disclosure includes various modifications and further includes modifications within the range of equivalency. Further, various combinations and forms, further, other combinations and forms including only one element or more, or less of them, are also included in the category and range of idea of the present disclosure.

There has hitherto known a shift device that switches a shift range by controlling a motor in response to a shift range switching request from a driver. For example, in JP 2016-75364 A, a position of a valley bottom is learned by using a predetermined amount of play provided between two intermediate gears.

In JP 2016-75364 A, a biasing force of a detent spring is a force that acts so that a roller falls into a valley section. In a shift range switching system, when the range is switched, a state in which the spring load acts in the direction to assist the motor torque and a state in which the spring load acts in the direction to hinder the motor torque occur repeatedly as the roller moves up and down on a mountain section and the valley section.

When a motor that generates cogging torque is used as a drive source, a torque balance point occurs in which a load torque due to the spring load is balanced with a cogging torque and a torque due to motor friction and the like. Here, when a motor-off failure occurs in which the motor cannot be driven during a switching of the shift range, the torque is balanced depending on the motor position at the time of the motor off failure, and an output shaft of the motor stops at an intermediate range. If the output shaft stops at the intermediate range, an appropriate hydraulic pressure cannot be generated by an automatic transmission, therefore, there is a possibility that leads to failure of the automatic transmission. An object of the present disclosure is to provide a shift range control device that can protect the automatic transmission even when an abnormality that cannot drive the motor occurs.

A shift range control device of the present disclosure switches a shift range by controlling a drive of a motor, and includes an abnormality monitoring unit and a torque control command unit. The abnormality monitoring unit detects an abnormality occurrence of an intermediate range stop in which the output shaft to which the drive of the motor is transmitted stops in an intermediate range region. The intermediate range region is a range outside a range guarantee region that guarantees the function of each range. The torque control command unit issues a command to suppress the torque applied to the automatic transmission when the abnormality of the intermediate range stop occurs. Thus, it is possible to prevent the automatic transmission from malfunctioning due to the occurrence of the abnormality of the intermediate range stop.

The invention claimed is:

1. A shift range control device configured to switch a shift range by controlling a drive of a motor having a permanent magnet and generating cogging torque periodically, the shift range control device comprising:
an abnormality monitoring unit configured to detect an abnormality occurrence of an intermediate range stop in which an output shaft, to which the drive of the motor is transmitted, stops in an intermediate range region, which is outside a range guarantee region that guarantees a function of each range; and
a torque control command unit configured to instruct suppression of torque applied to an automatic transmission when the abnormality of the intermediate range stop occurs, wherein
an engaging member enters a valley portion with an urging force of an urging member by using play between a motor shaft which is a rotation shaft of the motor and the output shaft, and
the abnormality of the intermediate range stop occurs when a motor-off failure occurs at a torque balance point on a way of a moving-up of the engaging member.

2. The shift range control device according to claim 1, wherein
the torque control command unit is configured to issue a neutral instruction to a transmission control unit configured to control the automatic transmission.

3. The shift range control device according to claim 2, wherein
the torque control command unit issues an instruction of engine torque suppression to an engine control unit so as to control an engine torque as the suppression of torque applied to the automatic transmission.

4. The shift range control device according to claim 1, wherein
the torque control command unit is configured to issue an instruction of engine torque suppression to an engine control unit so as to control an engine torque as the suppression of torque applied to the automatic transmission.

5. A shift range device, comprising:
a motor having a motor shaft which is a rotation shaft and a permanent magnet, and configured to generate cogging torque periodically;
an output shaft to which drive of the motor is transmitted and having a play between the output shaft and the motor shaft;
a plurality of valley portions provided to the output shaft;
an engaging member configured to enter a valley portion, from the plurality of valley portions, with an urging force of an urging member by using the play; and
a shift range control mechanism configured to control the drive of the motor and switch a shift range by entering the engaging member with the valley portion provided to the output shaft, wherein
the shift range control mechanism includes:
an abnormality monitoring unit configured to detect an abnormality occurrence of an intermediate range stop in which the output shaft, to which the drive of the motor is transmitted, stops in an intermediate range region, which is outside a range guarantee region that guarantees a function of each range; and
a torque control command unit configured to instruct suppression of torque applied to an automatic transmission when the abnormality of the intermediate range stop occurs, and
the abnormality of the intermediate range stop occurs when a motor-off failure occurs at a torque balance point on a way of a moving-up of the engaging member.

6. A shift range control device configured to switch a shift range by controlling a drive of a motor having a permanent magnet and generating cogging torque periodically, the shift range control device comprising:
a processor; and
a memory configured to store computer readable instructions that, when executed by the processor, cause the shift range control device to:
detect an abnormality occurrence of an intermediate range stop in which an output shaft, to which the drive of the motor is transmitted, stops in an intermediate range region, which is outside a range guarantee region that guarantees a function of each range; and
instruct suppression of torque applied to an automatic transmission when the abnormality of the intermediate range stop occurs, wherein
an engaging member enters a valley portion with an urging force of an urging member by using play between a motor shaft which is a rotation shaft of the motor and the output shaft, and
the abnormality of the intermediate range stop occurs when a motor-off failure occurs at a torque balance point on a way of a moving-up of the engaging member.

7. The shift range control device according to claim 6, wherein
the shift range control device is further caused to issue a neutral instruction to a transmission control device configured to control the automatic transmission.

8. The shift range control device according to claim 7, wherein
the shift range control device is further caused to issue an instruction of engine torque suppression to an engine control device so as to control an engine torque as the suppression of torque applied to the automatic transmission.

9. The shift range control device according to claim 6, wherein
the shift range control device is further caused to issue an instruction of engine torque suppression to an engine control device so as to control an engine torque as the suppression of torque applied to the automatic transmission.

* * * * *